(12) United States Patent
Weksler et al.

(10) Patent No.: US 8,171,523 B2
(45) Date of Patent: May 1, 2012

(54) EMBEDDED EMAIL RECEIVER AUTHENTICATION

(75) Inventors: Arnold S. Weksler, Raleigh, NC (US); Scott E. Kelso, Durham, NC (US); John C. Mese, Cary, NC (US); Nathan J. Peterson, Raleigh, NC (US); Rod D. Waltermann, Rougemont, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 1005 days.

(21) Appl. No.: 11/414,165

(22) Filed: Apr. 29, 2006

(65) Prior Publication Data
US 2007/0255790 A1 Nov. 1, 2007

(51) Int. Cl.
*G06F 17/30* (2006.01)
(52) U.S. Cl. ............................................ 726/2; 713/189
(58) Field of Classification Search .................. 726/2, 4, 726/5, 161, 170, 171, 172, 17, 20; 713/170, 713/161, 176, 172, 189; 709/206
See application file for complete search history.

(56) References Cited

U.S. PATENT DOCUMENTS

| | | | |
|---|---|---|---|
| 6,292,897 B1 | 9/2001 | Gennaro et al. | |
| 6,430,691 B1 | 8/2002 | Di Santo et al. | |
| 6,449,721 B1 | 9/2002 | Pensak et al. | |
| 6,643,684 B1 | 11/2003 | Malkin et al. | |
| 6,691,156 B1 | 2/2004 | Drummond et al. | |
| 6,775,771 B1 | 8/2004 | Shrader et al. | |
| 6,920,564 B2 * | 7/2005 | Decuir | 713/189 |
| 2002/0059144 A1 | 5/2002 | Meffert et al. | |
| 2002/0116610 A1 | 8/2002 | Holmes et al. | |
| 2002/0129275 A1 * | 9/2002 | Decuir | 713/201 |
| 2002/0144128 A1 * | 10/2002 | Rahman et al. | 713/186 |
| 2002/0169952 A1 | 11/2002 | DiSanto et al. | |
| 2003/0046533 A1 | 3/2003 | Olkin et al. | |
| 2003/0140235 A1 * | 7/2003 | Immega et al. | 713/186 |
| 2004/0073792 A1 * | 4/2004 | Noble et al. | 713/168 |
| 2005/0021984 A1 * | 1/2005 | Hollander | 713/186 |
| 2005/0050007 A1 * | 3/2005 | Sampson | 707/1 |
| 2005/0071632 A1 * | 3/2005 | Pauker et al. | 713/165 |
| 2005/0076220 A1 * | 4/2005 | Zhang et al. | 713/176 |
| 2005/0138353 A1 * | 6/2005 | Spies et al. | 713/153 |

(Continued)

FOREIGN PATENT DOCUMENTS
EP 0386867 A2 9/1990
(Continued)

OTHER PUBLICATIONS

Ted Aron, Client Security Solutions, Oct. 2004, Personal computing solutions white paper IBM, p. 1-9.*

*Primary Examiner* — Eleni Shiferaw
*Assistant Examiner* — Abu Sholeman
(74) *Attorney, Agent, or Firm* — Ference & Associates LLC

(57) ABSTRACT

The present invention relates to a method and system for providing an option when sending an email which will require the recipient of the email to provide an extra level of authentication before displaying the email contents in order to prove that he or she is indeed the correct recipient of the email. Validation is required by the recipient every time he or she opens an email. This validation occurs in the form of authentication that the user is indeed the intended recipient of the email, and can be provided in various means, including biometric identification, password phrases, and so forth.

15 Claims, 1 Drawing Sheet

U.S. PATENT DOCUMENTS

| | | | |
|---|---|---|---|
| 2005/0204008 A1* | 9/2005 | Shinbrood | 709/206 |
| 2006/0072144 A1* | 4/2006 | Dowling et al. | 358/1.15 |
| 2006/0242251 A1* | 10/2006 | Estable | 709/207 |
| 2007/0022291 A1* | 1/2007 | Thayer et al. | 713/176 |
| 2008/0294726 A1* | 11/2008 | Sidman | 709/206 |

FOREIGN PATENT DOCUMENTS

| | | | |
|---|---|---|---|
| JP | 2001290620 A | | 10/2001 |
| JP | 2002215537 A | | 8/2002 |
| JP | 2004064215 A | | 2/2004 |
| WO | WO 2004/006087 | * | 1/2004 |

* cited by examiner

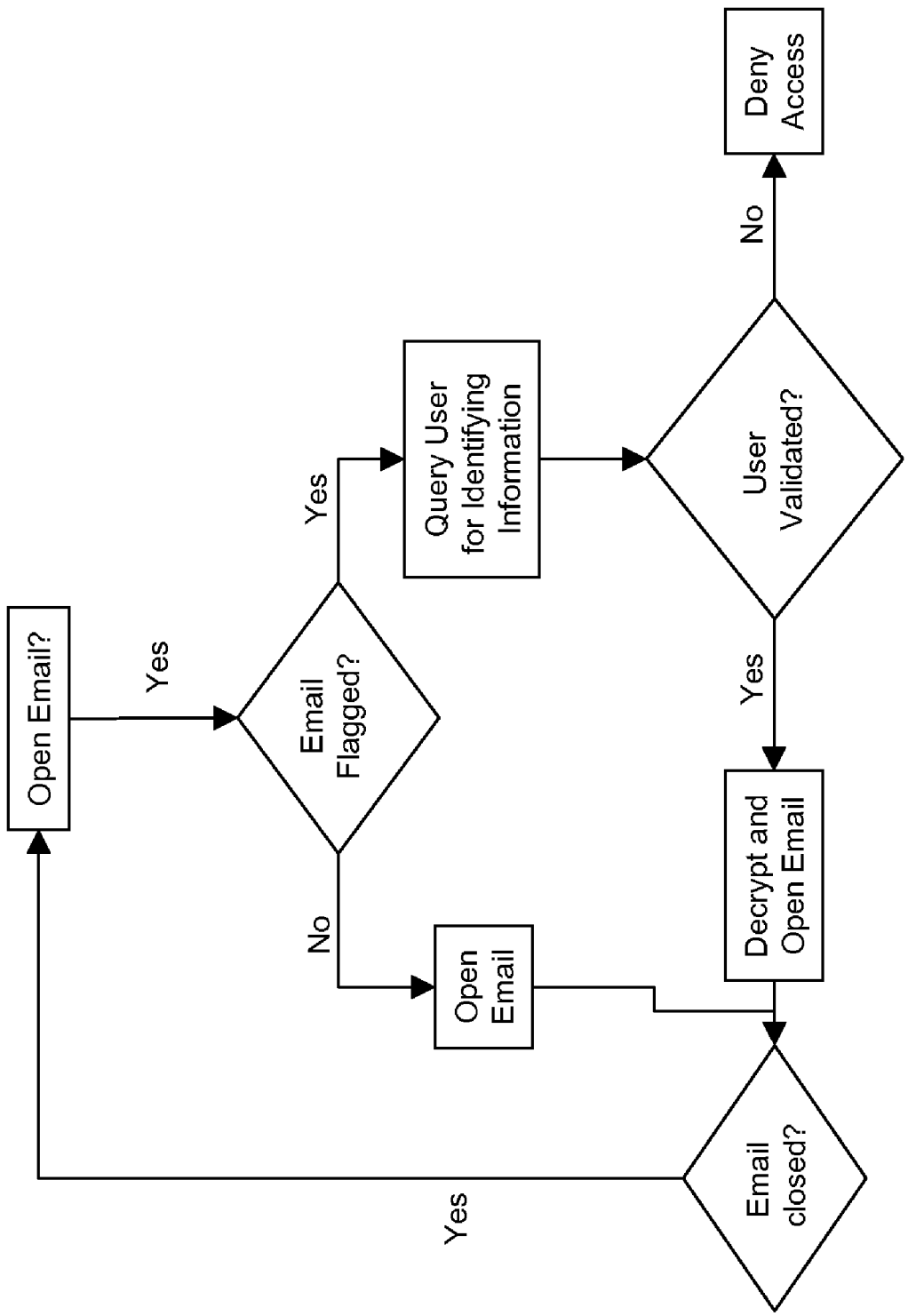

EMBEDDED EMAIL RECEIVER AUTHENTICATION

FIELD OF THE INVENTION

The present invention relates generally to providing a level of security for email communication.

BACKGROUND OF THE INVENTION

As the usage of computers becomes more widespread and the technology to produce them advances, so to does the amount of communication that is enabled by them. Business runs on communication and the ability to guarantee that the person accessing communication sent to them is actually the intended user is a necessary and important facet of that communication. Unfortunately, although technology has advanced to provide almost instant communication in the form of email, there is no such known ability or guarantee with email communication.

Email can be encrypted or marked confidential; however, an unauthenticated user who has access to the system could still read messages not intended for them. Confidentiality warnings can also be noticed, but are easily ignored, without any enforcement of such a warning. Encrypted information can be attached in an email in order to enhance security, but the message or data must be processed independent of the email client. Thus, when a user sends email today, there is no guarantee that the person receiving/reading the email is actually the intended target. The art has been advanced to the extent that those who receive communication may be required to produce a certificate, but again this produces no such guarantees.

Thus, there exists a need in the art for a method or system which is able to guarantee that the person receiving/reading an email is actually the intended target. Such a method would ensure that communication methods and data retrieval means remain protected and secure.

SUMMARY OF THE INVENTION

This present invention relates to a method for providing an option when sending a email which will require the recipient of the email to provide an extra level of authentication before displaying the email contents proving that he is indeed the correct recipient of the email.

In summary, one aspect of the invention provides a method for providing authentication that the recipient of an email is the intended recipient, said method comprising the steps of having identifying information for a user provided when opening an email account; having a public/private key pair for the user for encryption created utilizing the identifying information; receiving an email that has been encrypted using the user's public key and flagged for extra protection; validating that the recipient of the email is the intended recipient; wherein validating involves querying the user for identifying information.

Another aspect of the invention provides a system for providing authentication that the recipient of an email is the intended recipient, comprising a provider that provides identifying information for a user when opening an email account; an encryption machine that utilizes the identifying information to create a public/private key pair for the user for encryption; a receiver that receives an email encrypted using the user's public key and that has been flagged for extra protection; a validator that validates that the recipient of the email is the intended recipient; wherein the validator involves querying the user for identifying information.

Another aspect of the invention provides a program storage device readable by machine, tangibly embodying a program of instructions executable by the machine to perform method steps for providing authentication that the recipient of an email is the intended recipient, said method comprising the steps of having identifying information for a user provided when opening an email account; having a public/private key pair for the user for encryption created utilizing the identifying information; receiving an email that has been encrypted using the user's public key and flagged for extra protection; validating that the recipient of the email is the intended recipient; wherein validating involves querying the user for identifying information.

For a better understanding of the present invention, together with other and further features and advantages thereof, reference is made to the following description, and the scope of the invention will be pointed out in the appended claims.

FIG. 1 illustrates adding extra protection to email according to an embodiment of the invention.

DETAILED DESCRIPTION OF THE PREFERRED EMBODIMENTS

As mentioned above, the present invention relates to a method and system for providing an option when sending an email which will require the recipient of the email to provide an extra level of authentication before displaying the email contents in order to prove that he or she is indeed the correct recipient of the email. This option will be an action available to the user when the user is composing the email, by doing something as simple as checking a flag that states extra authentication is needed. In order to implement such an option, the email header of the email must be modified. A standard email header includes information about the sender, the sender's server, the recipient(s), the recipient's server(s), the subject, and so forth. This header would be modified with an extra field that would include information about whether the extra level of protection is needed. Each email client also needs to use this field to see if the email is a protected email and thus take some action accordingly to make sure the recipient of the email authenticates itself when it receives the communication.

Another option that can be used to convey an extra level of protection is to put that information in the mail content. With MIME mail, this option may be the preferred embodiment. In MIME email, the content is signed, whereas the header may not necessarily be signed. Thus, placing the extra level of protection in the header of the email may be futile because the header could be modified.

It is understood that in a preferred embodiment, these emails that offer an extra level of protection are also encrypted. It is known in the art to send encrypted emails from a sender to a recipient; however, the extra level of protection offered by the instant invention is a novel and unique aspect of email communication. In a preferred embodiment, public key encryption would be used. However, the instant invention can be implemented with any type of encryption that is well-known in the art to use, such as using symmetric encryption with shared keys. The emails are encrypted with a public key of the recipient. This public key can be obtained by a trusted root authority as is well-known in the art, or by other ways that are well-known in the art such as offline means of having the recipient provide the public key.

Referring to FIG. 1, as described herein, in a preferred embodiment, this extra level of protection involves a validation by the recipient each time they open an email that has been flagged for the protection. However, other embodiments may only require validation after a certain period of time has elapsed. Further embodiments may include revoking access to the email for a specified period of time if the validation is not successful, or is not successful after a given number of tries.

This validation is an authentication by the user. It is not limited to a specific type of authentication, but can be any authentication that identifies the user as the intended recipient of the email, such as a password phrase, biometric, pki key, and so forth. The user would have to provide some type of input (such as a biometric identification, password, or so forth) that enables the email client to determine that the user is indeed the intended recipient. Each email client has to ensure authenticity at open time. The present invention is implemented to work with any type of email client.

The encryption used by the instant invention is a two factor encryption that utilizes the authentication means provided by the recipient of the email during account initialization to make public and private keys. When a user decides to open an email account, they provide authentication means for use when determining their specific identity. Specifically, during initialization of an email account with the server, the user provides input to initialize some type of authentication means with server. As stated above, the authentication means can be one of any known authentication means known in the art, such as biometric authentication, public key encryption, password phrase storage, and so forth. The server sends this authentication means to each email client that the user utilizes and creates a public key/private key pair that is used in providing an extra level of protection for email communication. The public key is generated based on information provided by the recipient during account initialization. The present invention augments the encryption by requiring that some of that information comes from the intended recipient. Specifically, as stated above, the instant invention utilizes two-factor encryption which combines multiple factors together to create the public and private keys. The public key (or part of the public key) is then published to a trusted root authority, allowing senders to query the trusted root authority, obtain the user's public key, and send the user encrypted emails with an extra level of protection.

By tagging the email with the extra protection, the server is able to recognize that the encryption key should contain the information necessary to provide that extra level of protection. The sender's server goes to the trusted root authority and obtains the recipients public key. The server also negotiates the recipient's server and obtains the other half of the public encryption key. The server encrypts the email using the total public key, flags it as requiring authentication, and sends it to the recipient. The recipient server sends the email to the recipient. The recipient's email client requires authentication from the recipient to open the email because the authentication is part of the decryption key. It is only after the authentication is received that the email can be decrypted and opened by the recipient.

This validation is necessary each and every time the user opens an email, thus ensuring that only the intended recipient is able to open his or her email. It is also to be understood that the emails may be viewed by others that the intended recipient certifies or allows. Specifically, the intended recipient may open an email through the method of the instant invention and call another person over to read the same email before closing it. Thus, although there is a guarantee that the intended recipient is the only person able to open an email sent to him or her, there is no such guarantee that no other person or user will be able to view the email.

In summary, the present invention relates to a method and system for providing an option when sending an email which will require the recipient of the email to provide an extra level of authentication before displaying the email contents in order to prove that he or she is indeed the correct recipient of the email. Validation is required by the recipient every time he or she opens an email. This validation occurs in the form of authentication that the user is indeed the intended recipient of the email, and can be provided in various means, including biometric identification, password phrases, and so forth.

It is to be understood that the present invention, in accordance with at least one presently preferred embodiment, includes elements which may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method comprising:

receiving, at a client device, an encrypted email message;

in response to an attempt to open the encrypted email message at an email client of the client device, validating at the email client that a user is an intended recipient of the encrypted email message;

wherein said validating comprises: querying the user for identifying information of the intended recipient at the email client; and using the identifying information of the user to decrypt said encrypted email message at the email client;

wherein said validating occurs in response to each attempt to open the encrypted email message at the email client;

wherein the encrypted email message is displayed upon validation; and wherein the encrypted email message is encrypted utilizing multifactor encryption not dependent on sender identifying information and public key of the intended recipient; and wherein the public key is generated based on the identifying information of the intended recipient during account initialization.

2. The method of claim 1, wherein the identifying information is biometric information.

3. The method of claim 1, wherein the identifying information is a pass phrase.

4. The method of claim 1, wherein the identifying information is obtained from a smart card.

5. The method of claim 1, wherein the identifying information is obtained from a key fob.

6. The method of claim 1, further comprising:

flagging the encrypted email for extra protection;

wherein the encrypted email message that has been flagged for extra protection comprises a modified header indicating selection for extra protection.

7. The method of claim 1, wherein the validating includes determining whether user has permission to view the encrypted email message at the time the validation occurs.

8. A program storage device readable by machine, tangibly embodying a program of instructions executable by the machine to perform steps for providing authentication that a user is an intended recipient of an email, said steps comprising:

receiving an encrypted email message; in response to an attempt to open the encrypted email message at an email client, validating that the user of the encrypted email message is an intended recipient at the email client;

wherein said validating comprises querying the user for identifying information of the intended recipient at the email client; and using the identifying information of the user to decrypt said encrypted email message at the email client;

wherein said validating occurs in response to each attempt to open the encrypted email message at the email client;

wherein the encrypted email message is displayed upon validation; and wherein the encrypted email message is encrypted utilizing multifactor encryption not dependent on sender identifying information and public key of the intended recipient; and wherein the public key is generated based on the identifying information of the intended recipient during account initialization.

9. The system of claim 8, wherein the identifying information is biometric information.

10. The system of claim 8, wherein the identifying information is a pass phrase.

11. The system of claim 8, wherein the identifying information is obtained from a smart card.

12. The system of claim 8, wherein the identifying information is obtained from a key fob.

13. The system of claim 8, wherein the encrypted email is flagged for extra protection, and further wherein the encrypted email message that has been flagged for extra protection comprises a modified header indicating selection for extra protection.

14. A program storage device readable by machine, tangibly embodying a program of instructions executable by the machine to perform steps for providing authentication that a user is an intended recipient of an email, said steps comprising:

receiving an encrypted email message;

in response to an attempt to open the encrypted email message at an email client, validating that the user of the encrypted email message is an intended recipient at the email client;

wherein said validating comprises querying the user for identifying information of the intended recipient at the email client; and using the identifying information of the user to decrypt said encrypted email message at the email client;

wherein said validating occurs in response to each attempt to open the encrypted email message at the email client;

wherein the encrypted email message is displayed upon validation; and wherein the encrypted email message is encrypted utilizing multifactor encryption not dependent on sender identifying information and public key of the intended recipient; and wherein the public key is generated based on the identifying information of the intended recipient during account initialization.

15. The method of claim 1, wherein said utilizing multifactor encryption only requires of a sender an indication that an email message addressed to a recipient that is pre-registered with a third party is flagged for extra protection.

* * * * *